(12) United States Patent
Glen et al.

(10) Patent No.: US 12,551,034 B2
(45) Date of Patent: Feb. 17, 2026

(54) POT STAND

(71) Applicant: BREVCO PTY LTD, Martin (AU)

(72) Inventors: Garry Joseph Glen, Martin (AU); Edward Joseph Khoury, Bateman (AU)

(73) Assignee: BREVCO PTY LTD, Martin (AU)

( * ) Notice: Subject to any disclaimer, the term of this patent is extended or adjusted under 35 U.S.C. 154(b) by 0 days.

(21) Appl. No.: 18/841,114

(22) PCT Filed: Feb. 21, 2023

(86) PCT No.: PCT/AU2023/050117
§ 371 (c)(1),
(2) Date: Aug. 23, 2024

(87) PCT Pub. No.: WO2023/159567
PCT Pub. Date: Aug. 31, 2023

(65) Prior Publication Data
US 2025/0151932 A1   May 15, 2025

(30) Foreign Application Priority Data
Feb. 23, 2022 (AU) .............................. 2022900420

(51) Int. Cl.
*A47G 7/04* (2006.01)
*F16M 11/24* (2006.01)

(52) U.S. Cl.
CPC ............ *A47G 7/041* (2013.01); *F16M 11/24* (2013.01)

(58) Field of Classification Search
CPC ........ A47G 7/041; A47G 7/02; A47B 47/025; A47F 5/101
See application file for complete search history.

(56) References Cited

U.S. PATENT DOCUMENTS 2,517,842 A * 8/1950 Church .................... A01G 5/00
                                                    47/41.13
3,470,641 A * 10/1969 Meyer ..................... G09F 1/04
                                                    40/607.1

(Continued)

FOREIGN PATENT DOCUMENTS

CN         103989362 A  *  8/2014
WO    WO-2010055412 A1  *  5/2010  ............. A01G 27/06

OTHER PUBLICATIONS

Translation of CN-103989362-A (Year: 2014).*

(Continued)

*Primary Examiner* — Kimberly S Berona
*Assistant Examiner* — Steven J Shur
(74) *Attorney, Agent, or Firm* — MH2 Technology Law Group, LLP

(57) ABSTRACT

A pot stand (10) comprising planar first and second side members (12) connected together and having vertical first and second edges (34 and 36) and planar first and second connecting members (16 and 18) connecting across between the first and second edges (34 and 36) of the side members (12 and 14). Pot supports (38) are provided on the first and second edges (34 and 36) of the first and second side members (12 and 14) and on vertical side edges (46 and 48) of the connecting members (16 and 18). Each pot support (38) includes an upper protrusion (42) defining a recess into which an upper edge of a pot (11) may be received such that the pot (11) is supported between aligned pot supports (38).

11 Claims, 9 Drawing Sheets

(56) References Cited

U.S. PATENT DOCUMENTS

| | | | | |
|---|---|---|---|---|
| 4,026,220 | A | * | 5/1977 | Schuring, Jr. .......... A47G 7/041 |
| | | | | 211/186 |
| 4,440,812 | A | * | 4/1984 | Norrid ..................... A01G 5/04 |
| | | | | 428/542.2 |
| 2009/0056216 | A1 | * | 3/2009 | Falk ....................... A47G 7/042 |
| | | | | 47/67 |

OTHER PUBLICATIONS

Translation of WO-2010055412-A1 (Year: 2010).*
International Search Report and Written Opinion mailed in PCT/AU2023/050117 on Mar. 21, 2023 ( 7 pages).

* cited by examiner

POT STAND

CROSS-REFERENCE TO RELATED APPLICATIONS

This application is a U.S. National Stage application of PCT/AU2023/050117 filed 21 Feb. 2023, which claims priority to Australian Patent Application No. 2022900420 filed 23 Feb. 2022, and the entire disclosures of which are herein incorporated by reference.

FIELD OF THE INVENTION

The present invention relates to a pot stand.

BACKGROUND TO THE INVENTION

Pots for holding plants are often provided with stands for supporting one or more pots. Such pot stands can be used to keep the pots up off the ground and also to create an attractive arrangement where multiple plants can be supported around a raised structure.

The present invention relates to a pot stand for supporting multiple pots. The pot stand is aimed at being easy to transport and construct, while also providing an attractive and stable support for pot plants.

SUMMARY OF THE INVENTION

According to one aspect of the present invention there is provided a pot stand comprising:
- planar first and second side members connected together such that the first and second side members are oriented vertically and are parallel to each other, each of the first and second side members including vertical first and second edges;
- planar first and second connecting members, the first connecting member connecting between the first edge of the first side member and the first edge of the second side member and the second connecting member connecting between the second edge of the first side member and the second edge of the second side member;
- one or more pot supports provided on the first edge of the first side member aligned with one or more corresponding pot supports provided on the first edge of the second side member;
- one or more pot supports provided on the second edge of the first side member aligned with one or more corresponding pot supports provided on the second edge of the second side member;
- a pot support provided on a vertical first side edge of the first connecting member aligned with a pot support on a vertical first side edge of the second connecting member; and
- a pot support provided on a vertical second side edge of the first connecting member aligned with a pot support on a vertical second side edge of the second connecting member;
- wherein each pot support comprises an upper protrusion defining a recess into which an upper edge of a pot may be received such that the pot is supported between aligned pot supports.

Preferably each of the pot supports includes a lower protrusion defining a shoulder portion on which a bottom edge of a pot may rest.

Preferably each of the pot supports includes an angled intermediate portion located between the upper and lower protrusions, the intermediate portion being angled relative to a longitudinal axis of the first or second side member such that an upper end of the intermediate portion is located closer to the central longitudinal axis of the side member than a lower end thereof.

In a preferred embodiment, a pot support is provided on each of the first and second side members adjacent an upper end thereof, a pot support is provided on each of the first and second side members adjacent a lower end thereof and wherein the first and second connecting members connect between the first and second side members centrally between upper and lower ends thereof.

Preferably the first and second side members are spaced apart by a plurality of cross members.

Preferably each of the cross members comprises a planar member extending between adjacent faces of the first and second side members having one or more tabs on opposed edges to be received into corresponding slots in the first and second side members.

Preferably the tabs on the cross members include downturned transverse end portions such that when the tabs are received in the slots in the first and second side members, the cross members may be moved downwardly to engage the cross members with the first and second side members.

Preferably the connecting members each includes a plurality of slots to receive tabs extending outwardly from the first and second edges of the first and second side members.

Preferably the tabs extending outwardly from the first and second edges of the first and second side members include upturned transverse end portions such that when the tabs are received in the slots in the connecting members, the connecting members may slide downwardly such that the transverse end portions on the tabs restrict movement of the connecting members away from the side members.

Preferably a base is provided to engage with lower ends of the first and second side members to support the first and second side members in the upright position.

In a preferred embodiment, the base comprises planar first and second base members, the first base member including a first slit in an upper edge thereof and the second base member including a second slit in a lower edge thereof such that the first and second base members are connected together by engagement of the first and second slits so that the first and second base members are perpendicular.

Preferably lower ends of the first and second side members and lowermost cross members include slits to receive upper edges of the first and second base members

BRIEF DESCRIPTION OF THE DRAWINGS

The invention will now be described, by way of example, with reference to the following drawings, in which.

DETAILED DESCRIPTION OF PREFERRED EMBODIMENTS

Figure 1:
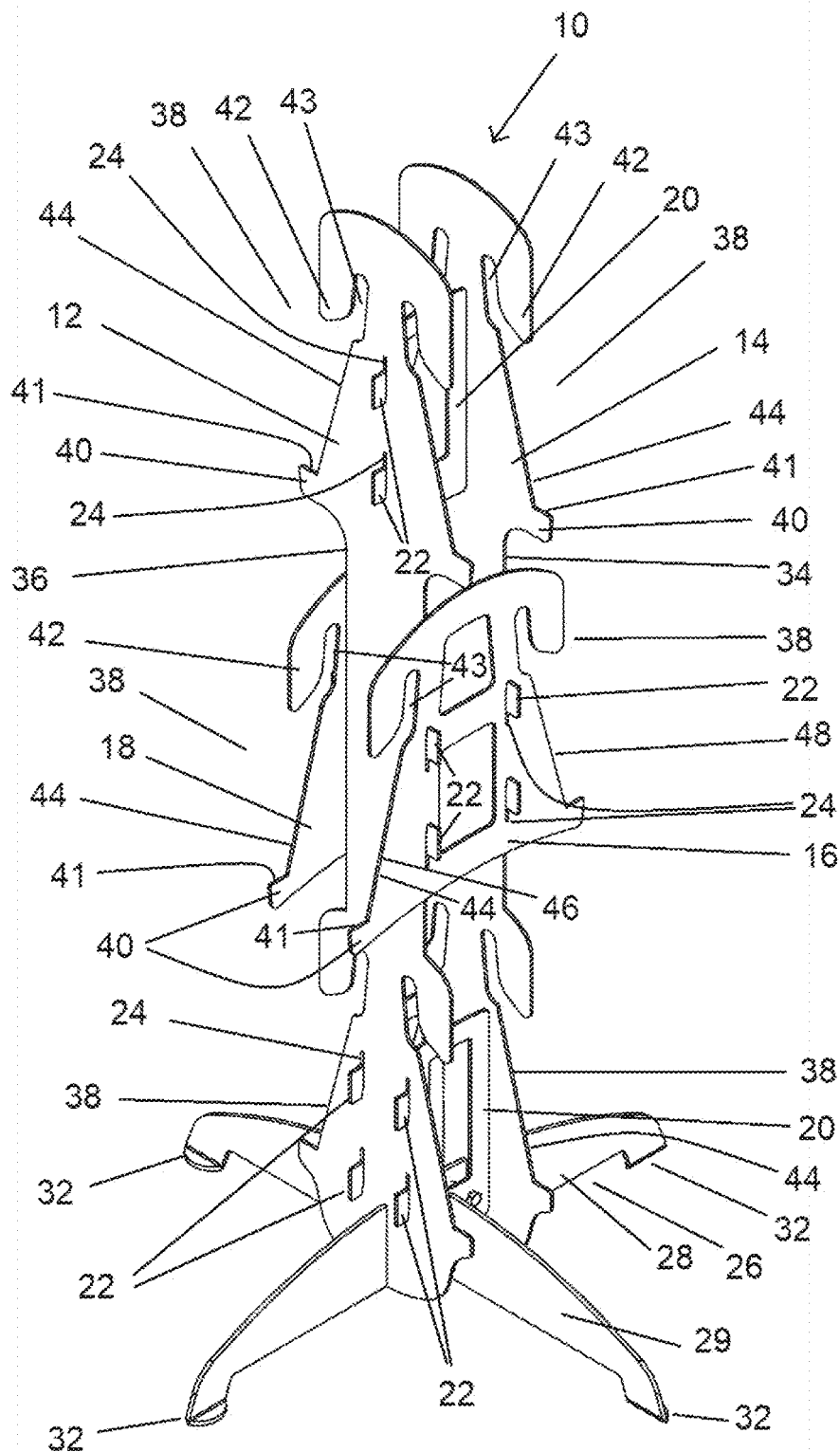
FIG. 1 is an upper perspective view of a pot stand in accordance with the present invention.
Figure 2:
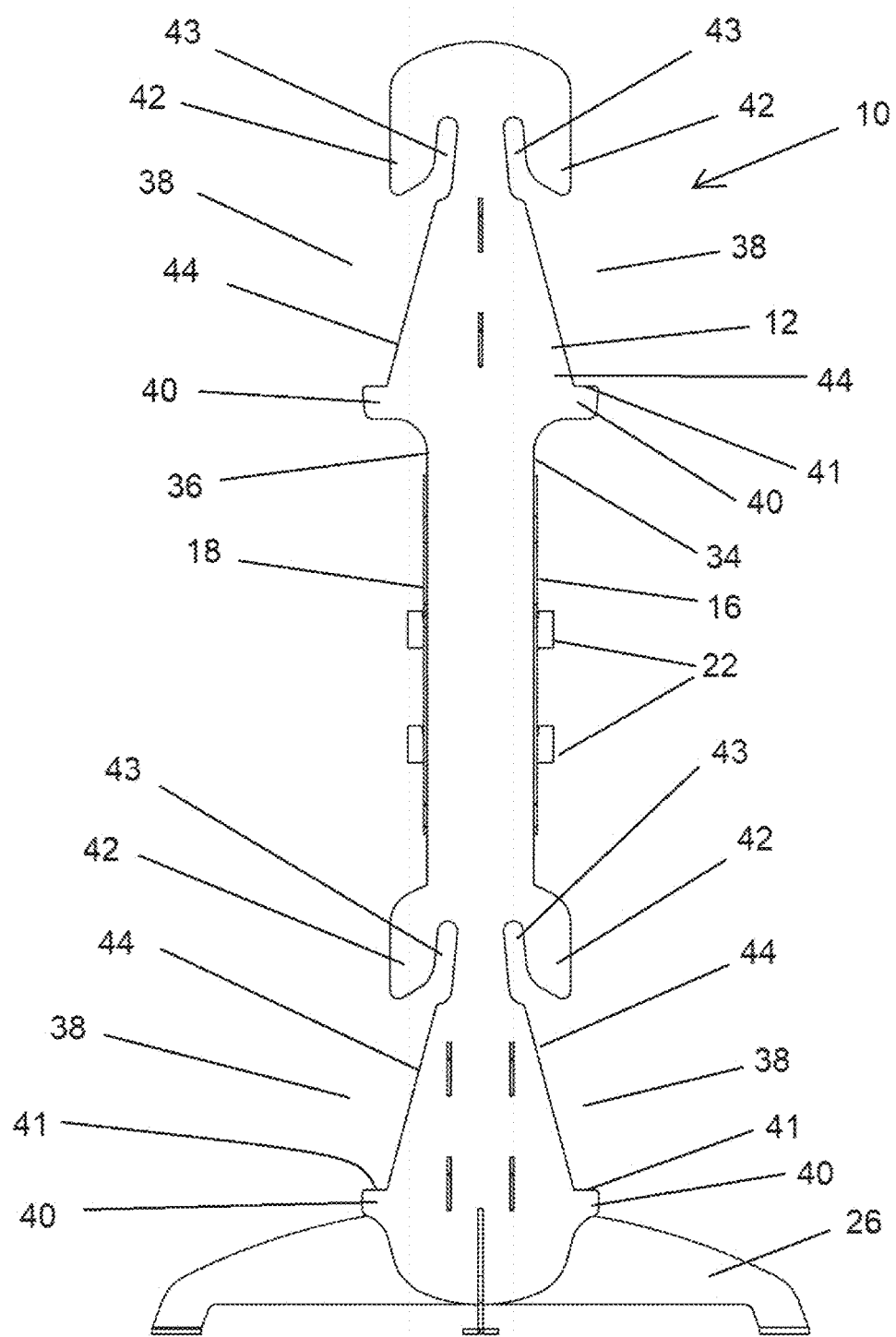
FIG. 2 is a side view of the pot stand of FIG. 1.
Figure 3:
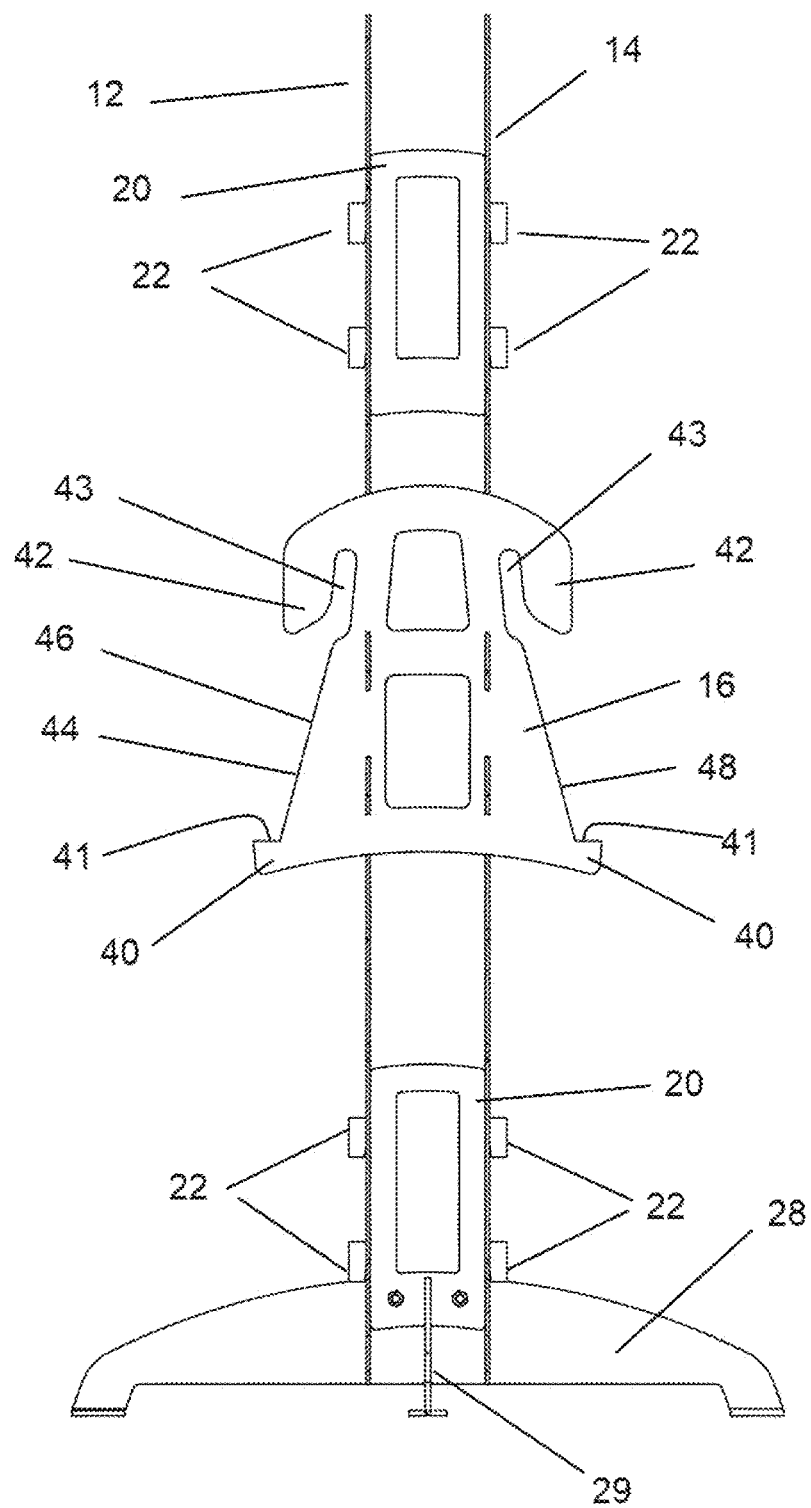
FIG. 3 is a front view of the pot stand of FIG. 1.
Figure 4:
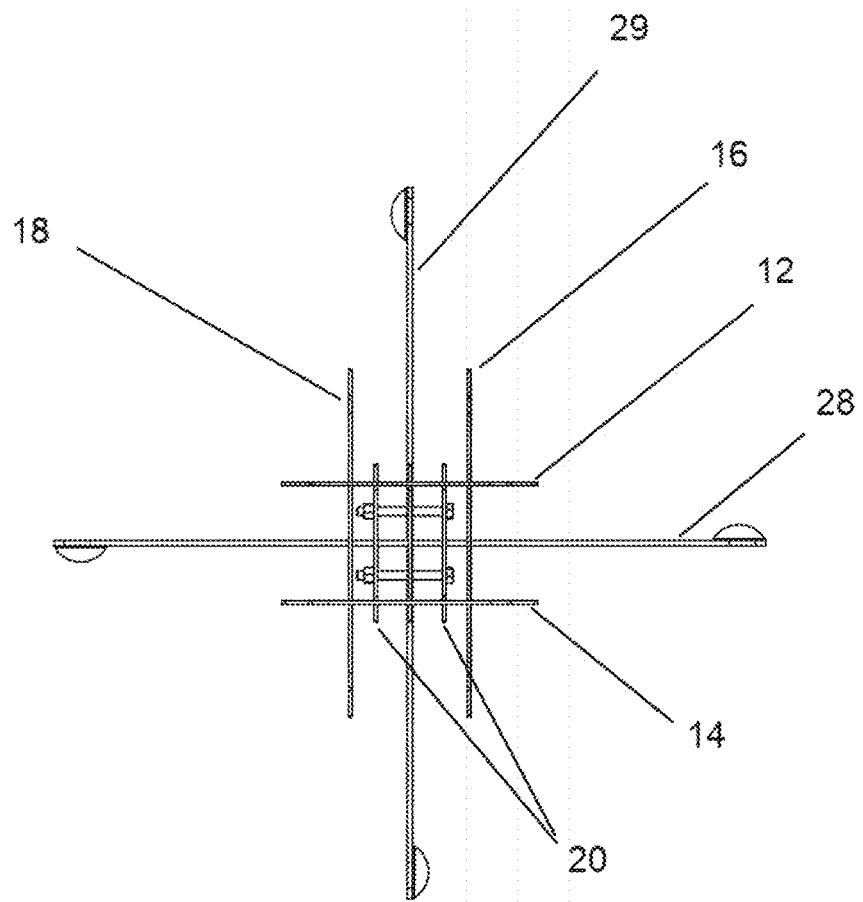
FIG. 4 is a top view of the pot stand of FIG. 1.
Figure 5:
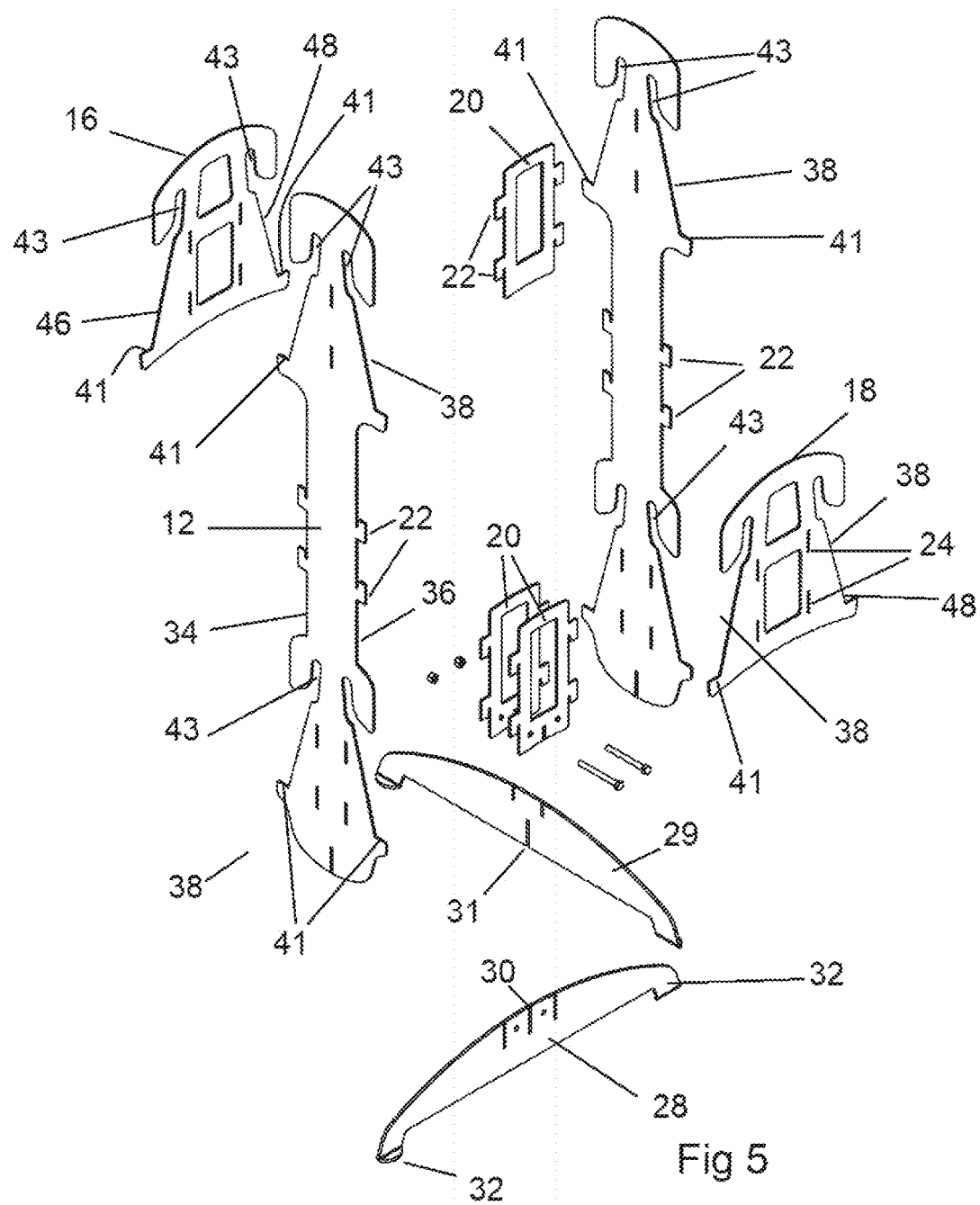
FIG. 5 is an exploded view of the pot stand of FIG. 1.
Figure 6:
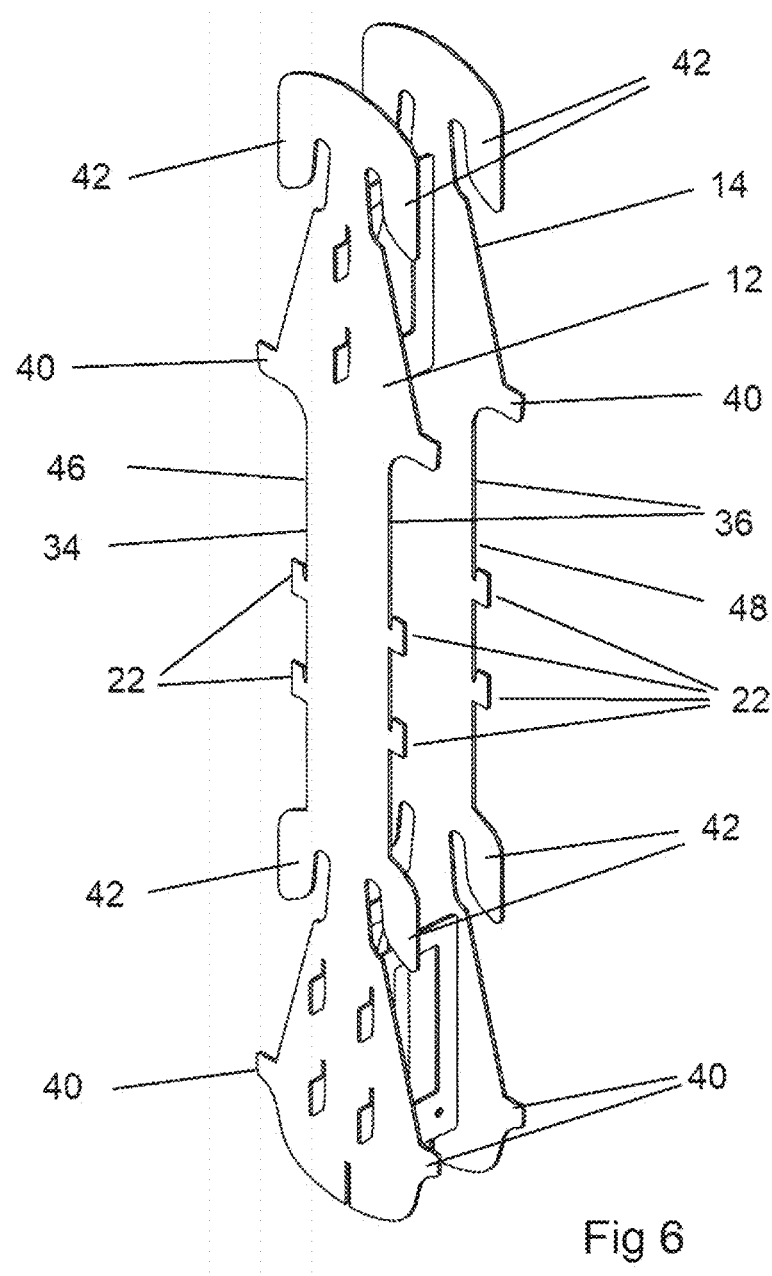
FIG. 6 is an upper perspective view of the first and second side members of the pot stand of FIG. 1.
Figure 7:
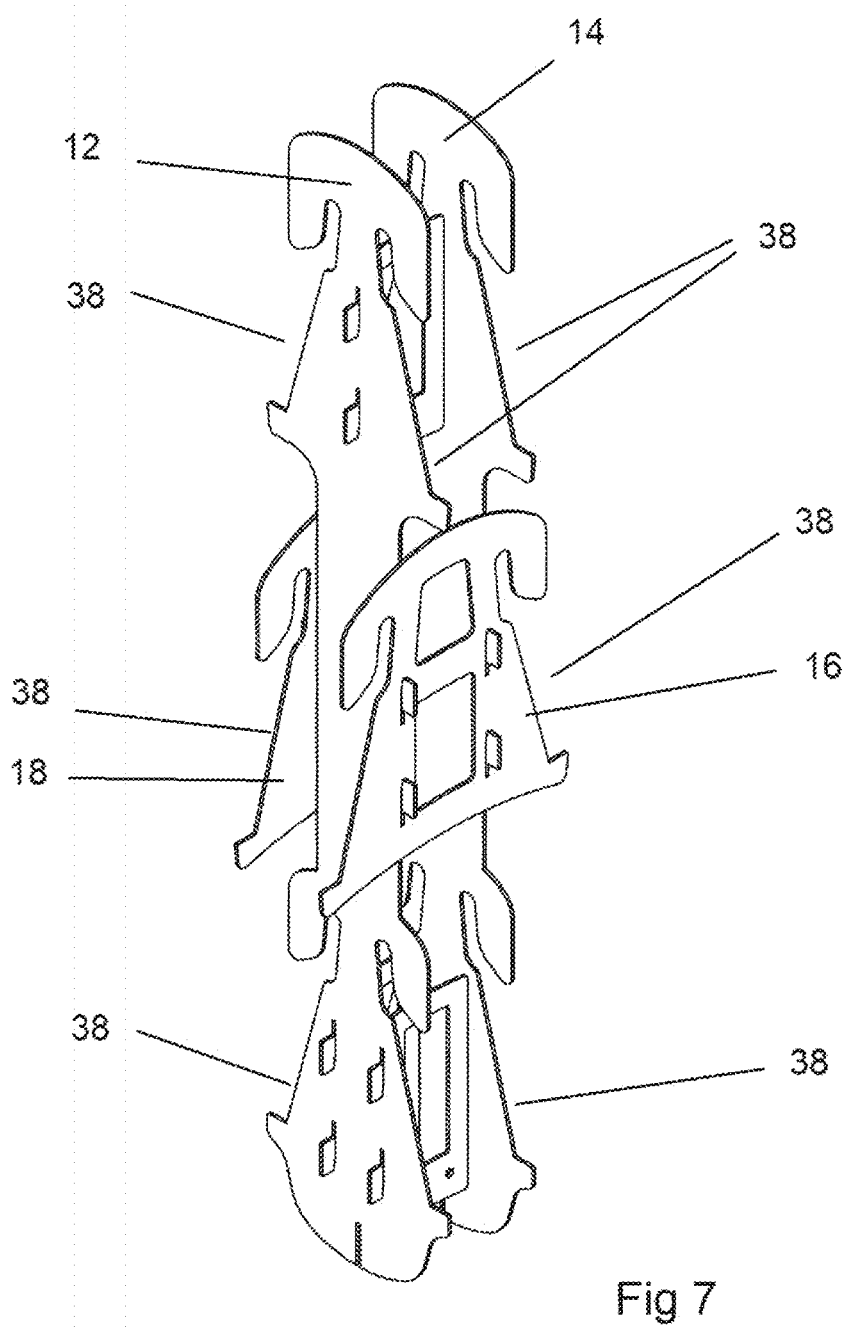
FIG. 7 is an upper perspective view of the first and second side members of the pot stand joined together with first and second connecting members.
Figure 8:
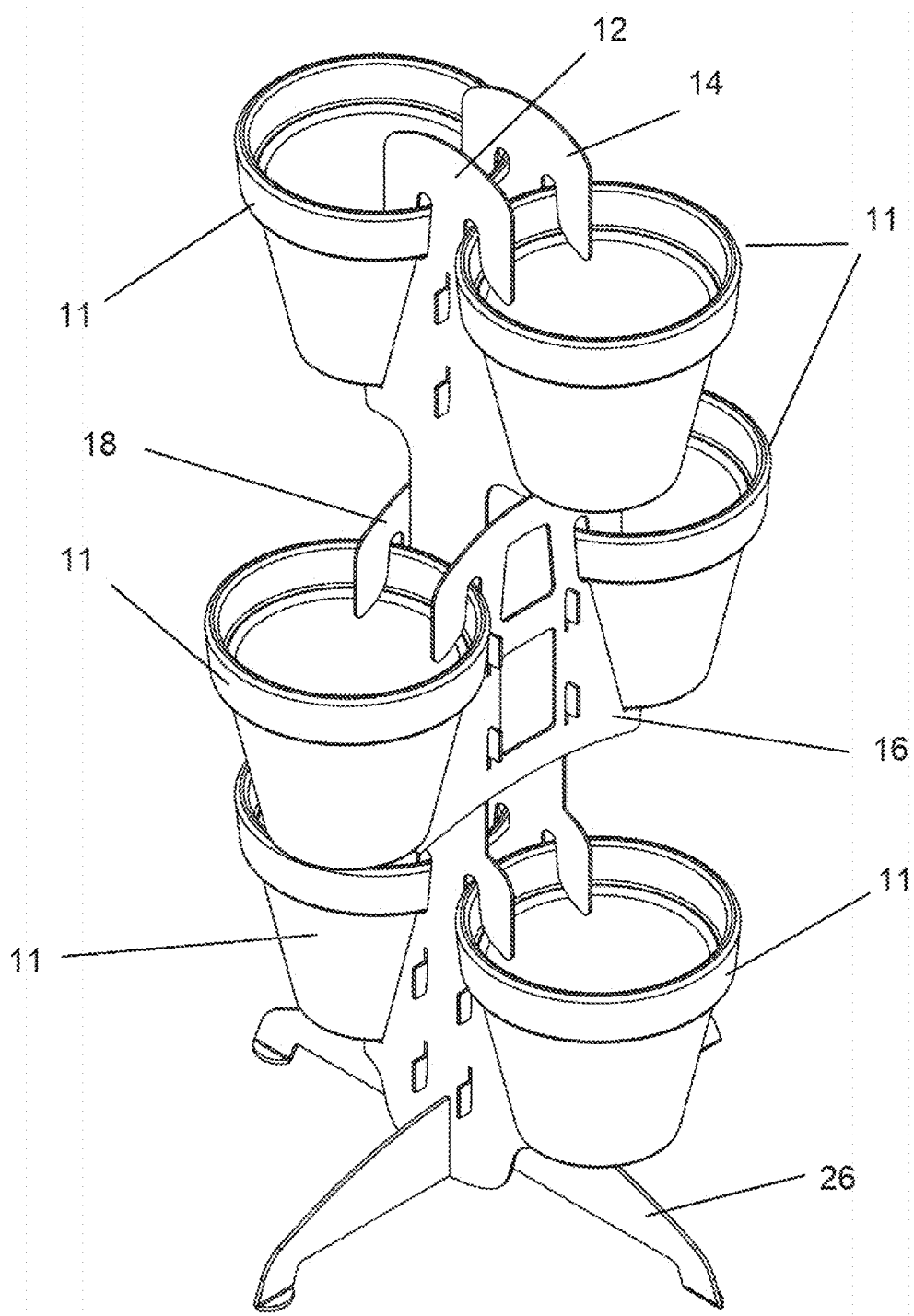
FIG. 8 is an upper perspective view of the pot stand of FIG. 1 shown supporting a set of pots.
Figure 9:
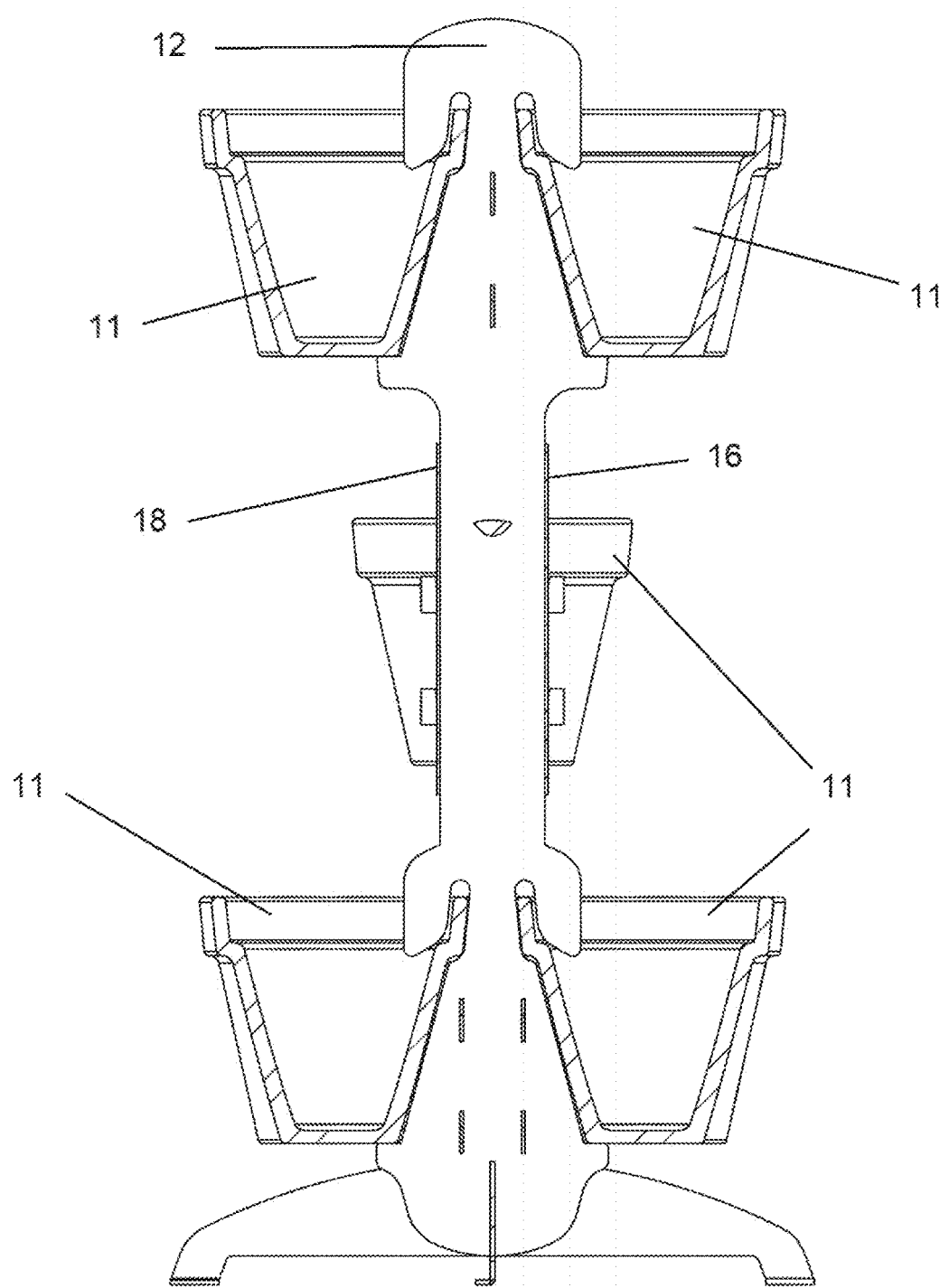
FIG. 9 is a side cross sectional view of the pot stand of FIG. 1 supporting the set of pots.

Referring to the Figures, there is shown a pot stand 10 comprising generally first and second side members 12 and 14 and first and second connecting members 16 and 18 for supporting a plurality of pots 11.

The first and second side members 12 and 14 comprise planar elongate members to be oriented vertically in use. The first and second side members 12 and 14 are connected together such that the first and second side members 12 and 14 are parallel. The first and second side members 12 and 14 each include longitudinal first and second edges 34 and 36 which are oriented generally vertically in use.

The first and second side members 12 and 14 are spaced apart by a plurality of cross members 20. Each of the cross members 20 comprises a planar member extending between adjacent faces of the first and second side members 12 and 14. Each of the cross members 20 includes one or more tabs 22 on opposed edges thereof. The tabs 22 are received into corresponding slots 24 in the first and second side members 12 and 14. The tabs 22 on the cross members 20 each includes a downturned transverse end portion such that when the tabs 22 are received in the slots 24 in the first and second side members 12 and 14, the cross member 20 may be moved downwardly to engage the cross member 20 with the first and second side members 12 and 14 and restrict movement of the first and second side members 12 and 14 away from the cross member 20.

There is provided one or more cross members 20 adjacent a lower end of the first and second side members 12 and 14 and one or more cross members 20 adjacent upper ends of the first and second side members 12 and 14. In the embodiment shown in the drawings, there is provided a pair of cross members 20 adjacent a lower end of the first and second side members 12 and 14 and a single central cross member 20 extending between the first and second side members 12 and 14 adjacent upper ends thereof.

The pot stand 10 is provided also with a base 26. The base 26 rests on the ground and engages lower ends of the first and second side members 12 and 14 to support the first and second side members 12 and 14 in the upright position. In the embodiment shown, the base 26 comprises planar first and second base members 28 and 29. The first base member 28 includes a first slit 30 in an upper edge thereof and the second base member 29 includes a second slit 31 in a lower edge thereof such that the first and second base members 28 and 29 are connected together by engagement of the first and second slits 30 and 31 so that the first and second base members 28 and 29 are perpendicular. The first and second base members 28 and 29 are elongate and include feet 32 on opposed ends thereof. Lower ends of the first and second side members 12 and 14 and lowermost cross members 20 include slits to receive upper edges of the first and second base members 28 and 29.

The first and second edges 34 and 36 each include one or more pot supports 38 to engage with a pot 11. Each of the pot supports 38 on the first side member 12 is aligned with a corresponding pot support 38 on the second side member 14 such that a single pot 11 may be engaged with an aligned pair of pot supports 38 on the first and second side members 12 and 14.

In the embodiment shown, the first and second side members 12 and 14 each include two pot supports 38 on each of the first and second edges 34 and 36. Each of the first and second edges 34 and 36 includes a pot support 38 located adjacent an upper end thereof and a pot support 38 located adjacent a lower end thereof.

In the embodiment shown, each of the pot supports 38 comprises a lower protrusion 40 and an upper protrusion 42. The lower protrusion 40 extends outwardly from the longitudinal edge 34 or 36 defining an upwardly facing shoulder portion 41 on which a lower edge of the base of the pot 11 may rest in use.

The upper protrusion 42 extends outwardly from the longitudinal edge 34 or 36 to define a downwardly facing recess 43 located above the shoulder portion 41 of the pot support 38. The downwardly facing recess 43 is provided to receive an upper edge of one of the pots 11. In use, a pot 11 can be engaged with an aligned pair of pot supports 38 by moving the pot 11 upwardly so that the upper edge thereof is received in the recess 43 and then moving the lower edge of the pot 11 inwardly to rest on the shoulder portion 41 of the lower protrusion 40. The distance between the upper and lower protrusions 40 and 42 is dimensioned to receive a standard size of pot 11.

In a further embodiment (not shown), the pot support 38 may comprise only the upper protrusion 42 and not the lower protrusion 40. In this case, the pot 11 would hang from the upper end thereof.

Each of the pot supports 38 includes also an angled intermediate portion 44 located between the upper and lower protrusions 42 and 40. The intermediate portion 44 is angled relative to a longitudinal axis of the first or second side member 12 and 14 such that an upper end of the intermediate portion 44 is located closer to the central longitudinal axis of the side member 12 or 14 than a lower end thereof. The intermediate portion 44 therefore generally aligns with an angled side wall of a standard pot 11.

The first and second side members 12 and 14 are spaced apart by the cross members 20 and are connected together by a plurality of the connecting members 16 and 18. In the embodiment shown, there are provided first and second connecting members 16 and 18 where the first connecting member 16 connects between first edges 34 of the first and second side members 12 and 14 and the second connecting member 18 connects between second edges 36 of the first and second side members 12 and 14.

Each of the first and second connecting members 16 and 18 is planar and includes a plurality of slots 24. The slots 24 receive tabs 22 extending outwardly from the edges 34 and 36 of the first and second side members 12 and 14. The tabs 22 extending outwardly from the first and second edges 34 and 36 of the first and second side members 12 and 14 include up-turned transverse end portions such that when the tabs 22 are received in the slots 24 in the connecting members 16 and 18, the connecting members 16 and 18 may slide downwardly such that the transverse end portions on the tabs 22 restrict movement of the connecting members 16 and 18 away from the side members 12 and 14.

The connecting members 16 and 18 include opposed first and second side edges 46 and 48 to be arranged generally vertically in use. The first and second side edges 46 and 48 of the connecting members 16 and 18 each include also a pot support 38, such that the pot supports 38 on the first connecting member 16 align with the pot supports 38 on the second connecting member 18 when the connecting members 16 and 18 are engaged with the first and second side members 12 and 14. Therefore, in use, when the connecting members 16 and 18 are engaged with the first and second side members 12 and 14, the pot supports 38 on the first and second connecting members 16 and 18 can support a pair of pots 11 such that the pots 11 are offset around a central longitudinal axis of the pot stand 10 by 90° from the pots 11 secured to the first and second side members 12 and 14.

In the embodiment shown, there are provided first and second connecting members 16 and 18 located generally centrally on the first and second side members 12 and 14. That is, the first and second connecting members 16 and 18 are located between the upper and lower pot supports 38 on the first and second side members 12 and 14. The side members 12 and 14 can therefore support four pots 11 and the connecting members 16 and 18 can support a further two pots 11 located between the pots 11 supported at upper and lower ends of the first and second side members 12 and 14. This arrangement, provides for both secure connection between the first and second side members 12 and 14 and the connecting members 16 and 18 and an even distribution of load from the pots 11 such that the pot stand 10 is well balanced and therefore stable.

It will be appreciated however that other configurations are possible where alternative number of pots 11 are provided on the first and second side members and additional connecting members 16 and 18 may also be used to support further pots 11 with positions rotated around from the pots 11 supported on the first and second side members 12 and 14.

In a further embodiment (not shown), additional fasteners may be used to further secure together the first and second side members 12 and 14. For example, bolts may be passed through aligned holes provided in the first and second connecting members 16 and 18 to pull the first and second connecting members 16 and 18 inwardly towards the first and second side members 12 and 14.

It will be readily apparent to persons skilled in the relevant arts that various modifications and improvements may be made to the foregoing embodiments, in addition to those already described, without departing from the basic inventive concepts of the present invention.

The invention claimed is:

1. A pot stand supporting one or more pots on a plurality of pot supports, the pot stand comprising:
    first and second side members each defining a planar surface, the first and second side members being connected together in such a manner that the first and second side members are oriented vertically and are parallel to each other, each of the first and second side members including vertical first and second edges, the first and second edges comprises first tabs extending outwardly, wherein
    the first edge of the first side member comprises a plurality of first pot supports of the plurality of pot supports, and the first edge of the second side member comprises a plurality of second pot supports of the plurality of pot supports, wherein each pair of the first and second pot supports are aligned with respect to each other for supporting one pot;
    the second edge of the first side member comprises a plurality of third pot supports of the plurality of pot supports, and the second edge of the second side member comprises a plurality of fourth pot supports of the plurality of pot supports, wherein each pair of the third and fourth pot supports are aligned with respect to each other for supporting one pot; and
    first and second connecting members each defining a connecting member planar surface, the first connecting member comprising first slots enclosed within the connecting member planar surface for receiving the first tabs connecting the first edge of the first side member and the first edge of the second side member, and the second connecting member comprising second slots enclosed within the connecting member planar surface for receiving the first tabs connecting between the second edge of the first side member and the second edge of the second side member,
    the first connecting member comprises a fifth pot support of the plurality of pot supports provided on a vertical first side edge of the first connecting member, and the second connecting member comprises a sixth pot support of the plurality of pot supports on a vertical first side edge of the second connecting member wherein the fifth and sixth pot supports are aligned with respect to each other for supporting one pot; and
    the first connecting member comprises a seventh pot support of the plurality of pot supports provided on a vertical second side edge of the first connecting member, and the second connecting member comprises an eight pot support of the plurality of pot supports on a vertical first side edge of the second connecting member wherein the seventh and eighth pot supports are aligned with respect to each other for supporting one pot.

2. The pot stand in accordance with claim 1, wherein each of the pot supports includes a lower protrusion defining a shoulder portion on which a bottom edge of a pot may rest.

3. The pot stand in accordance with claim 2, wherein each of the pot supports includes an angled intermediate portion located between an upper protrusion and the lower protrusion, the intermediate portion being angled relative to a longitudinal axis of the first or second side member such that an upper end of the intermediate portion is located closer to the central longitudinal axis of the side member than a lower end thereof.

4. The pot stand in accordance with claim 1, wherein a pot support of the plurality of pot supports of the first and second side members, respectively, is provided on each of the first and second side members adjacent an upper end thereof, a pot support is provided on each of the first and second side members adjacent a lower end thereof and wherein the first and second connecting members connect between the first and second side members centrally between upper and lower ends thereof.

5. The pot stand in accordance with claim 1, wherein each of the first and second side members comprises third slots enclosed within the planar surface, the first and second side members being spaced apart by a plurality of cross members, each cross member having opposed edges comprising second tabs extending outwardly therefrom.

6. The pot stand in accordance with claim 5, wherein each of the cross members comprises a planar member extending between adjacent faces of the first and second side members having one or more of the second tabs on the opposed edges to be received into corresponding slots in the first and second side members.

7. The pot stand in accordance with claim 6, wherein the second tabs on the cross members include downturned transverse end portions such that when the second tabs are received in the slots in the first and second side members, the cross members may be moved downwardly to engage the cross members with the first and second side members.

8. The pot stand in accordance with claim 1, wherein the first tabs extending outwardly from the first and second edges of the first and second side members include upturned transverse end portions such that when the first tabs are received in the slots in the connecting members, the connecting members may slide downwardly such that the transverse end portions on the first tabs restrict movement of the connecting members away from the side members.

9. The pot stand in accordance with claim 1, wherein a base is provided to engage with lower ends of the first and second side members to support the first and second side members in the upright position.

10. The pot stand in accordance with claim 9, wherein the base comprises planar first and second base members, the first base member including a first slit in an upper edge thereof and the second base member including a second slit in a lower edge thereof such that the first and second base members are connected together by engagement of the first and second slits so that the first and second base members are perpendicular.

11. The pot stand in accordance with claim 10, wherein lower ends of the first and second side members and lowermost cross members include slits to receive upper edges of the first and second base members.

\* \* \* \* \*